(12) United States Patent  
Jovenall et al.

(10) Patent No.: US 11,854,309 B2  
(45) Date of Patent: Dec. 26, 2023

(54) SYSTEMS AND METHODS FOR REMOTELY CONTROLLING LOCOMOTIVES WITH GESTURES

(71) Applicant: Cattron North America, Inc., Warren, OH (US)

(72) Inventors: Jeremy Jovenall, Mercer, PA (US); Brian Fette, Canfield, OH (US); Ryan Wooten, Strongsville, OH (US); Ronald Timothy Bailey, Jr., Newton Falls, OH (US)

(73) Assignee: Cattron North America, Inc., Warren, OH (US)

(*) Notice: Subject to any disclaimer, the term of this patent is extended or adjusted under 35 U.S.C. 154(b) by 0 days.

(21) Appl. No.: 17/959,159

(22) Filed: Oct. 3, 2022

(65) Prior Publication Data

US 2023/0137475 A1     May 4, 2023

Related U.S. Application Data

(60) Provisional application No. 63/273,893, filed on Oct. 30, 2021.

(51) Int. Cl.
*G06V 40/20* (2022.01)
*G06F 3/01* (2006.01)
(Continued)

(52) U.S. Cl.
CPC .............. *G06V 40/28* (2022.01); *B61L 3/065* (2013.01); *G06F 3/017* (2013.01); *G06V 10/82* (2022.01); *G06V 20/56* (2022.01); *G06V 40/10* (2022.01)

(58) Field of Classification Search
CPC .. B61L 3/127; B61L 3/128; B61L 3/08; B61L 3/065; B61L 5/12; B61L 23/04;
(Continued)

(56) References Cited

U.S. PATENT DOCUMENTS 5,021,715 A    6/1991  Smith et al.
6,693,584 B2   2/2004  Horst
(Continued)

FOREIGN PATENT DOCUMENTS

DE    102007021580 A1    11/2008
WO    WO-2006106789 A1   10/2006

OTHER PUBLICATIONS

Standard Railroad Signals, By George H. Baker, 2022, 32 pages.
(Continued)

*Primary Examiner* — George C Jin
(74) *Attorney, Agent, or Firm* — HARNESS, DICKEY & PIERCE, P.L.C.; Anthony G. Fussner

(57) ABSTRACT

Exemplary embodiments are disclosed of systems and methods for remotely controlling locomotives with gestures. In an exemplary embodiment, a system is configured for allowing an operator(s) to remotely control operation of a locomotive with gesture(s) made by an operator(s). The system includes at least one processor configured to be operable for visually recognizing gesture(s) made by an operator(s) in one or more images captured by at least one camera. A locomotive control unit is configured to be operable for controlling the operation of the locomotive according to the visually recognized gesture(s) made by the operator(s).

20 Claims, 3 Drawing Sheets

(51) Int. Cl.
*B61L 3/06* (2006.01)
*G06V 10/82* (2022.01)
*G06V 40/10* (2022.01)
*G06V 20/56* (2022.01)

(58) Field of Classification Search
CPC ........ G06F 3/017; G06V 10/82; G06V 20/56; G06V 40/18; G06V 40/28
See application file for complete search history.

(56) References Cited

U.S. PATENT DOCUMENTS

| | | | |
|---|---|---|---|
| 6,697,716 | B2 | 2/2004 | Horst |
| 6,789,004 | B2 | 9/2004 | Brousseau |
| 6,863,247 | B2 | 3/2005 | Horst |
| 6,928,342 | B2 | 8/2005 | Horst |
| RE39,011 | E | 3/2006 | Horst |
| RE39,210 | E | 8/2006 | Horst |
| 7,236,859 | B2 | 6/2007 | Horst |
| 7,379,572 | B2 | 5/2008 | Yoshida et al. |
| 8,170,372 | B2 | 5/2012 | Kennedy et al. |
| 8,971,581 | B2 | 3/2015 | Wu et al. |
| 10,186,147 | B2 | 1/2019 | Imai |
| 2004/0117073 | A1 | 6/2004 | Horst |
| 2004/0129840 | A1 | 7/2004 | Horst |
| 2016/0170494 | A1 | 6/2016 | Bonnet |
| 2018/0034950 | A1* | 2/2018 | Tanabe ................. H04M 1/605 |
| 2019/0156475 | A1 | 5/2019 | Markson et al. |
| 2020/0379575 | A1* | 12/2020 | Banerjee ................. G06F 3/012 |
| 2022/0366698 | A1* | 11/2022 | Braun ................. B61L 15/0027 |
| 2023/0202540 | A1* | 6/2023 | Ono ...................... G06V 20/58 246/120 |
| 2023/0280835 | A1* | 9/2023 | McDaniel .............. G06F 3/016 345/156 |

OTHER PUBLICATIONS

Systems for Edge Computing; NVIDIA, 6 pages, accessed Oct. 14, 2021.
Kumar et al., Object detection in real time based on imrpoved single shot multi-box detector algorithm,—*EURASIP Journal on Wireless Communications and Networking*; 2020, 18 pages.
OCU-III for Rail, BELTPACK™, Cattron.com, Jun. 2021, 2 pages.
LCS-III Locomotive Control System, Cattron.com, accessed Oct. 14, 2021, 2 pages.
Beltpack™ Locomotive Remote Control System, Cattron.com, accessed Oct. 1, 2021, 2 pages.
Safety Posters; Standard Crane Hand Signals, accuform.com, Sep. 21, 2021, 4 pages.
Boom Crane Hand Signals, accessed Sep. 21, 2021, 1 pages.
Rule 12. Hand, Flag and Lamp Signals, Streamlined Backshop Services, 2010-2022; 7 pages.

* cited by examiner

SYSTEMS AND METHODS FOR REMOTELY CONTROLLING LOCOMOTIVES WITH GESTURES

CROSS-REFERENCE TO RELATED APPLICATION

This application claims priority to and the benefit of U.S. Provisional Patent Application No. 63/273,893 filed Oct. 30, 2021. The entire disclosure of U.S. Provisional Patent Application No. 63/273,893 is incorporated herein by reference.

FIELD

The present disclosure generally relates to systems and methods for remotely controlling locomotives with gestures.

BACKGROUND

This section provides background information related to the present disclosure which is not necessarily prior art.

A locomotive may include an onboard locomotive control unit (LCU) configured to control one or more aspects of the locomotive, including starting, stopping, speed, braking, switching, etc. An operator may use a portable operator control unit (OCU) to remotely control the locomotive by sending commands, instructions, etc. from the OCU to the LCU via a wireless network. For example, a ground based operator may use the OCU to remotely control a locomotive in a railyard or a switching yard.

DRAWINGS

The drawings described herein are for illustrative purposes only of selected embodiments and not all possible implementations, and are not intended to limit the scope of the present disclosure.

Corresponding reference numerals may indicate corresponding (though not necessarily identical) parts throughout the several views of the drawings.

DETAILED DESCRIPTION

Figure 1:
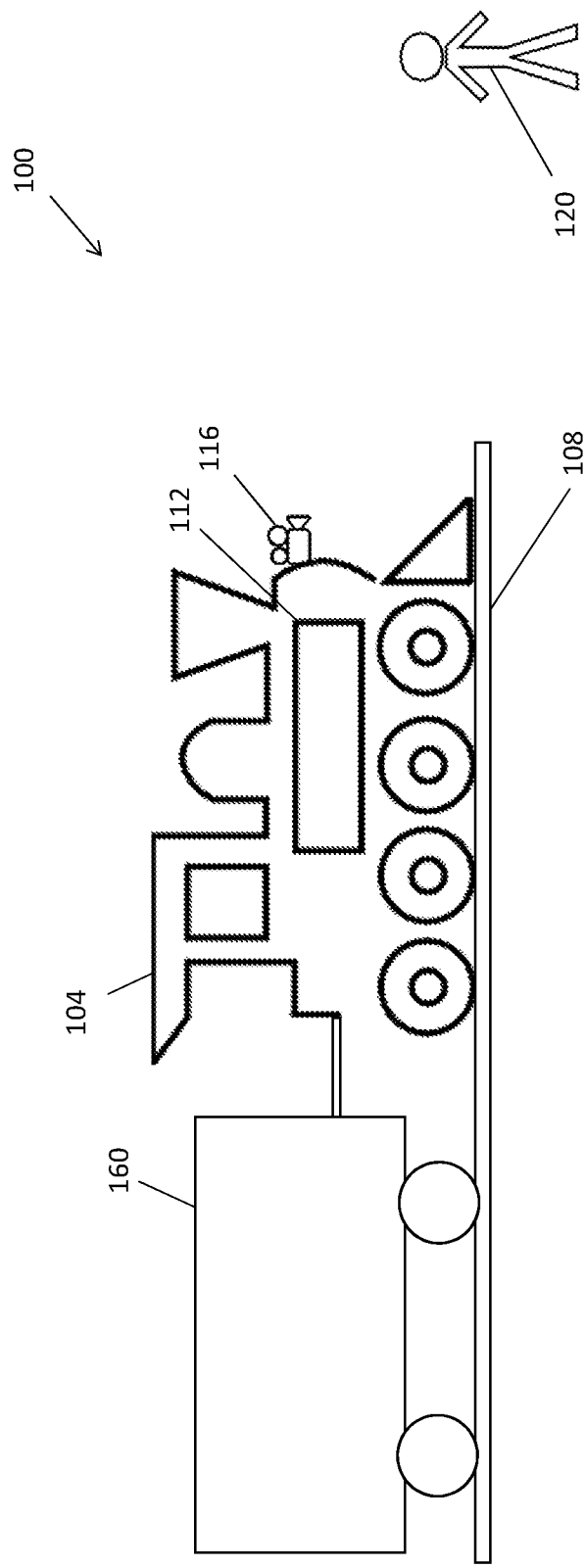
FIG. 1 is a diagram of a system configured to allow an operator to remotely control operation of a locomotive with gestures (e.g., an operator's hand signal(s), body language, pose(s), etc.) according to an example embodiment of the present disclosure.

Example embodiments will now be described more fully with reference to the accompanying drawings.

Disclosed herein are exemplary systems and methods for remotely controlling operation (e.g., start, stop, accelerate, decelerate, lights, audible alerts from bell(s)/horn(s), etc.) of a locomotive with gestures (e.g., hand signal(s), body language, pose(s), etc.) made by an operator (e.g., a ground based operator in a railyard or switching yard, etc.). As disclosed herein, the exemplary methods and systems utilize cameras and artificial intelligence/visual recognition technology (e.g., SSD (Single Shot Detector) neural network, YOLO (You Only Look Once) neural network, other neural network, etc.) to visually recognize the operator's gesture(s).

In exemplary embodiments, a system includes a camera onboard a locomotive. The camera is generally facing (e.g., front-facing, etc.) towards or aligned with (e.g., forward or rearward relative to, etc.) the direction of travel of the locomotive. The camera is configured to capture image(s) (e.g., still photo(s), video, etc.) of an operator's gesture(s). For example, a front-facing camera may capture video of the operator's gesture (e.g., hand signal to increase speed, decrease speed, stop, etc.) as the locomotive passes the operator while the locomotive is moving along a track. Or, for example, the front-facing camera may capture video of the operator's gesture(s) (e.g., start moving along the track, etc.) while the locomotive is stationary. The system also includes a processor (e.g., a trained visual recognition software program, component, or module, edge processing device running a neural network, etc.) that analyzes the video (broadly, image(s)) from the front-facing camera to visually recognize the operator's gesture(s) in the video. If the visually recognized operator gesture is determined to sufficiently correspond with a gesture allocated to a locomotive function or operation (e.g., accelerate, decelerate, start, stop, etc.), then the function or operation may be implemented or executed accordingly by a locomotive control unit (LCU) onboard the locomotive.

In a first example, an operator outside of and not onboard a locomotive may hold up a hand in a "stop" pose. An image(s) (e.g., a still photo(s), video, etc.) of the operator's hand signal in the stop pose may be captured by at least one camera onboard the locomotive. The camera may be connected to an edge computing device or processing device (e.g., Nividia Jetson edge device, other processing or computing device, etc.) running a neural network (e.g., SSD neural network, YOLO neural network, other neural network, other artificial intelligence or machine learning network, etc.). The edge processing device is in communication (e.g., via a serial connection, other connection, etc.) with a locomotive control unit (LCU) onboard the locomotive for relaying commands, instructions, etc. to the LCU. In this example, the edge processing device running the neural network analyzes the image(s) captured by the camera and visually recognizes the operator's hand signal in the stop pose. If it is determined that the visually recognized operator's hand signal in the stop pose sufficiently corresponds with a gesture allocated to a stop function, then the edge processing device interacts with the locomotive control unit (LCU) by relaying a stop command to the LCU over the serial connection. In response to receiving the stop command, the LCU may then control (e.g., algorithmically control, etc.) the locomotive to stop, e.g., according to a stopping trajectory including a deceleration profile, etc.

In a second example, an operator may wave a hand to "wave on" the locomotive. Video of the operator's hand waving may be captured by the camera onboard the locomotive. In this example, the edge processing device running the neural network analyzes the video captured by the camera and visually detects or recognizes the operator's hand signal waving on the locomotive. If it is determined that the visually recognized operator hand waving sufficiently corresponds with a gesture allocated to a move onward function, then the edge processing device interacts with the locomotive control unit (LCU) and relays a command to the LCU over the serial connection. In response to receiving the command, the LCU may then control (e.g., algorithmically control, etc.) the locomotive such that the locomotive and its payload are moved forward (e.g., slowly inched forward, etc.).

Advantageously, the exemplary gesture-based remote control locomotive (RCL) systems and methods disclosed herein may provide the ability to make small adjustments to a locomotive's speed, stopping, or lights, etc. in a natural and rapid way without any other required input. Exemplary embodiments disclosed herein may provide the ability to control locomotives using natural hand/body signals commonly accepted within the rail industry without a second operator or reliance on an Operator Control Unit (OCU). For example, exemplary embodiments disclosed herein may be configured to permit hand or lantern signals that were used prior to RCL systems to be used again by an operator for controlling a locomotive without the requirement of the operator wearing an OCU.

Figure 2:
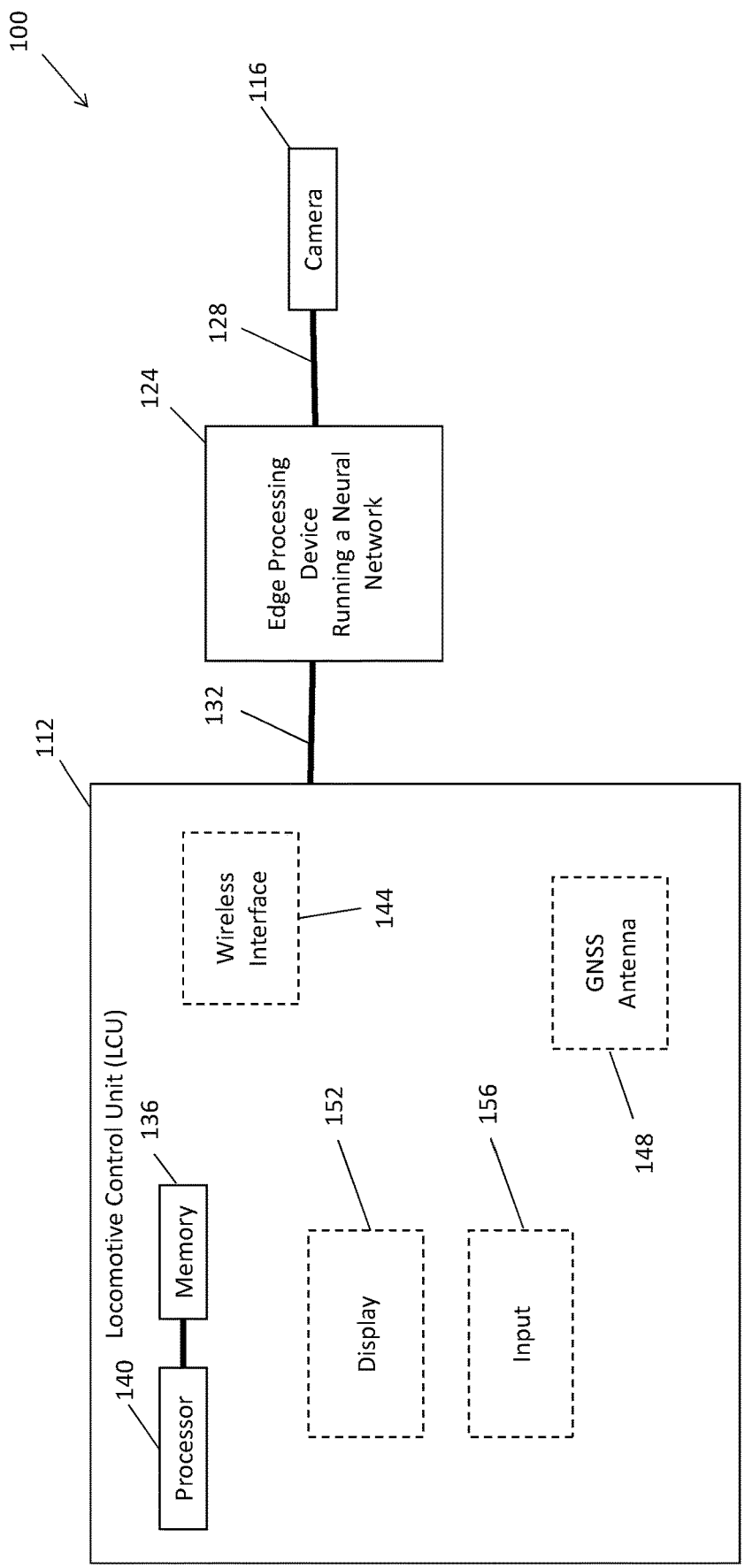
FIG. 2 is a block diagram showing example components including an edge processing device running a neural network that may be included in the system shown in FIG. 1 according to an example embodiment of the present disclosure.

FIGS. 1 and 2 illustrate an exemplary embodiment of a system 100 for remotely controlling operation of the locomotive with gesture(s) made by an operator(s) according to some aspects of the present disclosure. The locomotive 104 generally includes a tractive effort mechanism for moving the locomotive 104 along a track 108, and a braking mechanism for reducing a speed of the locomotive 104 along the track 108.

A locomotive controller or control unit (LCU) 112 is located onboard the locomotive 104. At least one camera 116 is also onboard the locomotive 104. The at least one camera 116 is generally facing forward relative to a direction of travel of the locomotive 104 for capturing image(s) (e.g., still photos, video, etc.) of gesture(s) made by the operator 120. For example, the camera 116 may capture video of the operator's gesture (e.g., hand signal to increase speed, decrease speed, stop, etc.) as the locomotive 104 passes the operator 120 while the locomotive 104 is moving along a track 108. Or, for example, the camera 116 may capture video of the operator's gesture(s) (e.g., start moving along the track, etc.) while the locomotive 104 is stationary and stopped along the track 108.

As shown in FIG. 2, this exemplary system 100 includes an edge processing device 124 running a neural network (e.g., SSD (Single Shot Detector) neural network, YOLO (You Only Look Once) neural network, other neural network, etc.). The edge processing device 124 is in communication with the camera 116 via a communication link 128 over which the edge processing device 124 may receive image(s) of the operator 120 captured by the camera 116. The edge processing device 124 is also in communication with the LCU 112 via communication link 132 (e.g., a serial connection, etc.) over which the edge processing device 124 interacts with and relays information (e.g., decisions, commands, instructions, etc.) to the LCU 112.

The edge processing device 124 is configured to be operable for detecting and recognizing gesture(s) (e.g., natural yet specific body language, etc.) of the operator 120 in the images captured by the camera 116. In this exemplary embodiment, the edge processing device 124 interacts with the LCU 112 onboard the locomotive 104 over the serial connection 132 to relay decision(s) based on visual observation(s) determined through the neural network model. The LCU 112 may then precisely control the locomotive 104 in accordance with an algorithm(s) associated with or allocated to the visually recognized operator's gesture(s). By way of example, the system 100 may include an SSD neural network that is trained (e.g., on cloud servers, etc.) and then deployed on the edge processing device 124 to detect industry standard operator commands from a two man crew, etc.

With continued reference to FIG. 2, the LCU 112 includes a memory 136 to store computer-executable instructions (e.g., algorithm(s), etc.) and a processor 140 in communication with the memory 136 to execute the computer-executable instructions within the memory 136.

In this illustrated exemplary embodiment, the LCU 112 is in communication via link 132 with the edge processing device 124, which, in turn, is in communication via link 128 with the camera 116 (FIG. 1). In alternative embodiments, the LCU 112 may integrally include or comprise the artificial intelligence/visual recognition technology for visually recognizing the operator's gesture(s). In which case, the LCU 112 may receive a video feed of the operator 120 captured by the camera 116. The processor 140 of the LCU 112 may be configured for analyzing the video feed from the camera 116 to visually recognize or identify the gesture(s) made by the operator 120. The locomotive controller 112 may then control (e.g., algorithmically control, etc.) the locomotive 104 according to the function or operation associated with the operator's gesture(s) as visually recognized by the processor 140 of the locomotive controller 112. In this alternative embodiment, the locomotive controller 112 may therefore directly control the locomotive 104 based on the operator's gesture(s) as visually recognized by the processor 140 within the locomotive controller 112, e.g., without the locomotive controller 112 having to receive command(s) or instruction(s) relayed from the edge processing device 124, etc.

The locomotive controller 112 may further include one or more wireless interfaces 144 (e.g., data ports, etc.), such as a short-range wireless communication interface, a Wi-Fi wireless communication interface, a cellular communication interface, other radio frequency (RF) interfaces, etc. The locomotive controller 112 may also include a global navigation satellite system (GNSS) antenna 148 (e.g., a GPS antenna, etc.), one or more accelerometers (e.g., an accelerometer array, a single accelerometer, etc.), etc. The locomotive controller 112 may be configured to report location, one or more parameters, etc. to an operator control unit, yard control server, etc.

The locomotive controller 112 may include a display 152 and an input 156. The display 152 can be any suitable display (e.g., a liquid crystal display (LCD), light emitting diodes (LED), indicator lights, etc.). The input 156 can include any suitable input element(s) (e.g., a keypad, touchscreen, switches, etc.), for receiving inputs (e.g., commands, etc.) from an operator.

In exemplary embodiments, the locomotive controller 112 may also be configured for communication with an operator control unit (OCU) for receiving commands from the operator control unit. In such exemplary embodiments, the locomotive 104 may be remotely controlled by the locomotive controller 112 via the operator's gestures and via commands received from the operator control unit. The operator control unit may include a user interface for receiving input from an operator and a wireless interface in communication with the locomotive controller 112. The operator control unit may be configured to receive one or more control commands from the operator via the user interface, and the operator control unit may be configured to transmit the received one or more control commands to the locomotive controller 112 to control operation of the locomotive 104. The operator control unit may include an enclosure (e.g., a housing, etc.) including a user interface, a display, etc. The operator control unit may include a processor, battery, memory, a global navigation satellite system (GNSS) antenna (e.g., a GPS antenna, etc.), one or more accelerometers (e.g., an accelerometer array, a single accelerometer, etc.) for tilt detection, etc.

The operator control unit may include a wireless interface for communicating with the locomotive controller 112 via an RF channel, etc. The operator control unit may include an optional global navigation satellite system (GNSS) antenna for determining a location of the operator control unit. For example, the GNSS antenna may be a global positioning system (GPS) antenna. The operator control unit may include a tilt sensor (e.g., an accelerometer array, a single accelerometer, etc.) for determining a tilt condition (e.g., a fall event of a field operator, etc.). The operator control unit may include an enclosure (e.g., a housing, etc.) including the user interface, the display, etc.

In exemplary embodiments, the system 100 may also be configured to determine whether or not the operator 120 is facing the locomotive 104 from the visually recognized images of the operator's gesture(s). For example, if the system 100 determines that the operator 120 is facing the locomotive 104, then the system 100 may determine that the gesture(s) of the operator 120 facing the locomotive 104 is applicable and therefore usable for remotely controlling the locomotive 104. Conversely, if the system 100 determines that the operator 120 is not facing the locomotive 104, then the system 100 may determine that the gesture(s) of the operator 120 that is not facing the locomotive 104 is not applicable and therefore not usable for remotely controlling the locomotive 104.

In exemplary embodiments, the system 100 may be configured to determine whether or not the operator 120 is on the port (left) or starboard (right) side of the locomotive 104 by monitoring the direction that the operator 120 enters and exits the frame of vision as the locomotive 104 passes the operator 120. For example, if the system 100 determines that the operator 120 is on the starboard side of the locomotive 104, then the system 100 may determine that the starboard side operator's gesture(s) is applicable and therefore usable for remotely controlling the locomotive 104. Conversely, if the system 100 determines that the operator 120 is on the port side of the locomotive 104, then the system 100 may determine that the port side operator's gesture(s) is not applicable and therefore not usable for remotely controlling the locomotive 104.

In FIG. 1, the camera 116 is mounted forward facing on the front of the locomotive 104 for capturing images of the operator 120. In other embodiments, the camera 116 may be located in any other suitable location for capturing images of the operator 120.

Although FIG. 1 illustrates a single locomotive 104, the locomotive 104 may be part of a locomotive consist that includes one or more locomotives, rail cars, etc. coupled to the locomotive 104. The locomotives of the consist may operate in tandem (e.g., by remote control, etc.), and may require electrical and pneumatic connections in order to operate together. The locomotive controller 112 may be configured to control movement of the locomotive consist along the track 108 (e.g., via a tractive effort mechanism, via a pneumatic braking system, etc.). Similarly, although FIG. 1 illustrates a single train car 160, other embodiments may include a train having more than one train car 160 coupled to the locomotive 104, no train cars 160 coupled to the locomotive 104, etc.

Figure 3:
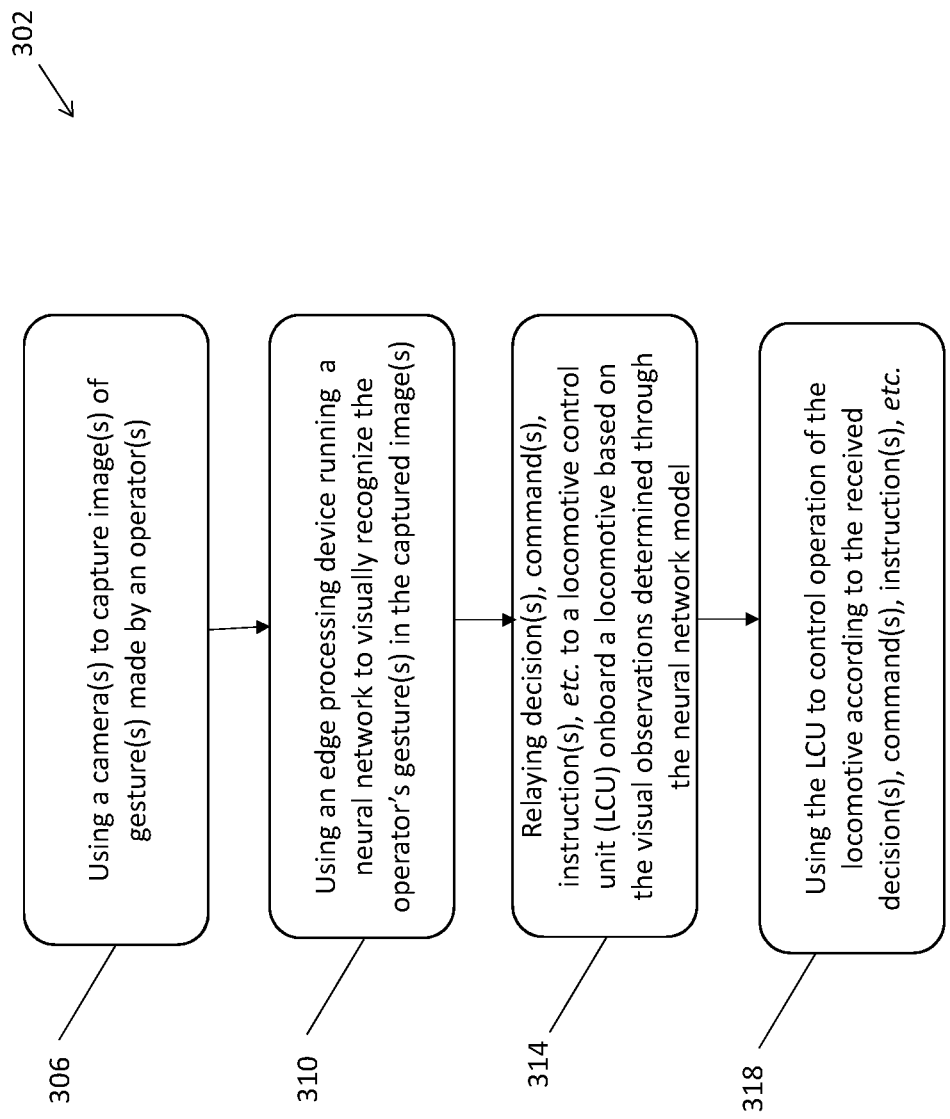
FIG. 3 is a flow chart illustrating an example method for remotely controlling operation of a locomotive with gestures (e.g., an operator's hand signal(s), body language, pose(s), etc.) according to an example embodiment of the present disclosure.

FIG. 3 illustrates an example a method 302 for remotely controlling operation of a locomotive with gestures (e.g., an operator's hand signal(s), body language, pose(s), etc.) according to an example embodiment of the present disclosure.

As shown in FIG. 3, the method 302 includes, at 306, using a camera(s) to capture image(s) (e.g., still photos, video, etc.) of gesture(s) made by an operator(s).

At 310, the method 302 includes using an edge processing device (broadly, a processor) running a neural network to visually recognize the operator's gesture(s) in the image(s) captured by the camera(s).

At 314, the method 302 includes relaying decision(s), command(s), instruction(s), etc. to a locomotive control unit (LCU) onboard the locomotive based on the visual observations or visually recognized operator gestures(s) determined through the neural network model.

At 318, the method 302 includes the LCU controlling operation of the locomotive according to the received decision(s), command(s), instruction(s), etc. For example the LCU may control the locomotive in accordance with an algorithm(s) associated with or allocated to the visually recognized operator's gesture(s).

Exemplary embodiments are disclosed of systems and methods for remotely controlling locomotives with gestures. In an exemplary embodiment, a system is configured for allowing an operator(s) to remotely control operation of a locomotive with gesture(s) made by an operator(s). The system includes at least one processor configured to be operable for visually recognizing gesture(s) made by an operator(s) in one or more images captured by at least one camera. A locomotive control unit is configured to be operable for controlling the operation of the locomotive according to the visually recognized gesture(s) made by the operator(s).

In exemplary embodiments, the at least one processor comprises an edge processing device and/or a neural network (e.g., SSD neural network, YOLO neural network, other neural network, etc.). For example, the at least one processor may comprise an edge processing device running an SSD neural network.

In exemplary embodiments, the at least one processor is in communication via a serial connection with the locomotive control unit. The at least one processor is configured to operable for relaying one or more decisions, commands, and/or instructions to the locomotive control unit over the serial connection based on the visually recognized gesture(s). The locomotive control unit is configured to be operable for controlling operation of the locomotive according to the one or more decisions, commands, and/or instructions relayed to the locomotive control unit from the at least one processor over the serial connection.

In exemplary embodiments, the locomotive control unit is configured to be operable for controlling operation of the locomotive in accordance with an algorithm(s) associated with or allocated to the visually recognized gesture(s).

In exemplary embodiments, the at least one camera, the at least one processor, and the locomotive control unit are onboard the locomotive.

In exemplary embodiments, the system includes the at least one camera comprising at least one video camera onboard the locomotive for capturing video of the gesture(s) made by the operator(s). The at least one processor is configured to visually recognize the gesture(s) made by the operator(s) in the video captured by the at least one video camera.

In exemplary embodiments, the at least one processor is configured to be operable for visually recognizing gesture(s)

made by an operator(s) that comprise one or more of an operator's hand signal(s), body language, and/or pose(s).

Also disclosed are exemplary methods of remotely controlling operation of a locomotive with gesture(s) made by an operator(s). In exemplary embodiments, the method includes capturing, via at least one camera, one or more images of gesture(s) made by an operator(s); visually recognizing, via at least one processor, the gesture(s) made by the operator(s) in the one or more images captured by the at least one camera; and controlling operation of the locomotive, via a locomotive control unit, according to the visually recognized gesture(s) made by the operator(s).

In exemplary embodiments, the at least one processor comprises an edge processing device. And the method includes visually recognizing, via the edge processing device, the gesture(s) made by the operator(s) in the one or more images captured by the at least one camera.

In exemplary embodiments, the at least one processor comprises a neural network. And the method includes visually recognizing, via the neural network, the gesture(s) made by the operator(s) in the one or more images captured by the at least one camera.

In exemplary embodiments, the at least one processor comprises an edge processing device running a single shot detector (SSD) neural network. And the method includes visually recognizing, via the edge processing device running the SSD neural network, the gesture(s) made by the operator(s) in the one or more images captured by the at least one camera.

In exemplary embodiments, the at least one processor is in communication via a serial connection with the locomotive control unit. And the method includes relaying one or more decisions, commands, and/or instructions based on the visually recognized gesture(s) from the at least one processor over the serial connection to the locomotive control unit. The method may further include controlling operation of the locomotive, via the locomotive control unit, according to the one or more decisions, commands, and/or instructions relayed to the locomotive control unit from the at least one processor over the serial connection.

In exemplary embodiments, the method includes controlling operation of the locomotive, via the locomotive control unit, in accordance with an algorithm(s) associated with or allocated to the visually recognized gesture(s).

In exemplary embodiments, the at least one camera, the at least one processor, and the locomotive control unit are onboard the locomotive.

In exemplary embodiments, the at least one camera comprising at least one video camera onboard the locomotive for capturing video of the gesture(s) made by the operator(s). And the method includes: capturing, via the at least one video camera, video of the gesture(s) made by the operator(s); and visually recognizing, via the at least one processor, the gesture(s) made by the operator(s) in the video captured by the at least one video camera.

In exemplary embodiments, the visually recognized gesture(s) made by the operator(s) comprise one or more of an operator's hand signal(s), body language, and/or pose(s).

In exemplary embodiments, the exemplary systems and methods disclosed herein may be configured to allow an operator(s) to remotely control operation of a locomotive by using standard railroad manual signals. In such exemplary embodiments, the exemplary systems and methods may be configured to capture, via at least one camera, one or more images of the signal(s) made by an operator(s), visually recognize, via at least one processor, the signal(s) made by the operator(s) in the one or more images captured by the at least one camera, and control operation of the locomotive, via a locomotive control unit, according to the visually recognized signal(s) made by the operator(s).

The manual signals may be given with the operator's hand, a flag, or a lantern or flashlight (broadly, a light source) during the daily performance of the railroader/operator's work. The manual signals may include Train Has Parted, Reduce Speed, Easy, Stop, Back Up, Release Air Brakes, Apply Air Brakes, Whistle, and Proceed.

For the Train Has Parted signal, the operator swings a flag, a light source, or hand vertically in a full circle at full arm's length across the track when the train is running.

For the Reduce Speed signal, the operator holds a flag, a light source, or hand horizontally at arm's length.

For the Easy signal, the operator horizontally moves a flag, a light source, or hand back and forth from "A" to "B" at a slow or fast pace according to the speed of movement desired. Generally, location A is to the side of the operator's at full arm's length, and location B is in closer to or in front of the operator's shoulder.

For the Stop signal, the operator swings a flag, a light source, or hand back and forth across the track.

For the Back Up signal, the operator swings a flag, a light source, or hand vertically in a circle at half arm's length across the track when the train is standing or backing.

For the Release Air Brakes signal, the operator holds a flag, a light source, or hand at arm's length above the head when the train is standing.

For the Apply Air Brakes signal, the operator swings a flag, a light source, or hand horizontally above the head when the train is standing.

For the Whistle signal, the operator vertically swings a flag, a light source, or hand between "A" and "B" to simulate pulling a whistle cord. Generally, location A is above the operator's head, and location B is above the operator's shoulder but below the location A.

For the Proceed signal, the operator raises and lowers a flag, a light source, or hand vertically.

Although various exemplary embodiments are described herein in relation to remotely controlling locomotives with operator gesture(s), the systems and methods disclosed herein are applicable to other industrial machines and machine control units. Alternative embodiments are contemplated in relation to various other types of machines, including overhead crane systems, mobile cranes, other industrial machines, other machine control units in addition to locomotive control units, etc.

In exemplary embodiments, the exemplary systems and methods disclosed herein may be configured to allow an operator(s) to remotely control operation of a mobile crane by using mobile crane hand signals. In such exemplary embodiments, the exemplary systems and methods may be configured to capture, via at least one camera, one or more images of the signal(s) made by an operator(s), visually recognize, via at least one processor (e.g., an edge processing device running a neural network, etc.), the signal(s) made by the operator(s) in the one or more images captured by the at least one camera, and control operation of the mobile crane, via a machine control unit (MCU), according to the visually recognized signal(s) made by the operator(s). The mobile crane hand signals may include Hoist, Lower, Use Main Hoist, Use Whipline, Raise Boom, Lower Boom, Move Slowly, Raise the Boom and Lower the Load, Lower the Boom and Raise Load, Swing, Stop, Emergency Stop, Travel, Dog Everything, Travel (Both Tracks), Travel (One Track), Extend Boom, Retract Boom, Extend Boom (One Hand), and Retract Boom (One Hand).

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms, and that neither should be construed to limit the scope of the disclosure. In some example embodiments, well-known processes, well-known device structures, and well-known technologies are not described in detail. In addition, advantages and improvements that may be achieved with one or more exemplary embodiments of the present disclosure are provided for purposes of illustration only and do not limit the scope of the present disclosure, as exemplary embodiments disclosed herein may provide all or none of the above mentioned advantages and improvements and still fall within the scope of the present disclosure.

Specific dimensions, specific materials, and/or specific shapes disclosed herein are example in nature and do not limit the scope of the present disclosure. The disclosure herein of particular values and particular ranges of values for given parameters are not exclusive of other values and ranges of values that may be useful in one or more of the examples disclosed herein. Moreover, it is envisioned that any two particular values for a specific parameter stated herein may define the endpoints of a range of values that may be suitable for the given parameter (i.e., the disclosure of a first value and a second value for a given parameter can be interpreted as disclosing that any value between the first and second values could also be employed for the given parameter). For example, if Parameter X is exemplified herein to have value A and also exemplified to have value Z, it is envisioned that parameter X may have a range of values from about A to about Z. Similarly, it is envisioned that disclosure of two or more ranges of values for a parameter (whether such ranges are nested, overlapping or distinct) subsume all possible combination of ranges for the value that might be claimed using endpoints of the disclosed ranges. For example, if parameter X is exemplified herein to have values in the range of 1-10, or 2-9, or 3-8, it is also envisioned that Parameter X may have other ranges of values including 1-9, 1-8, 1-3, 1-2, 210, 2-8, 2-3, 3-10, and 3-9.

The term "about" when applied to values indicates that the calculation or the measurement allows some slight imprecision in the value (with some approach to exactness in the value; approximately or reasonably close to the value; nearly). If, for some reason, the imprecision provided by "about" is not otherwise understood in the art with this ordinary meaning, then "about" as used herein indicates at least variations that may arise from ordinary methods of measuring or using such parameters. For example, the terms "generally", "about", and "substantially" may be used herein to mean within manufacturing tolerances.

The terminology used herein is for the purpose of describing particular example embodiments only and is not intended to be limiting. For example, when permissive phrases, such as "may comprise", "may include", and the like, are used herein, at least one embodiment comprises or includes the feature(s). As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

The foregoing description of the embodiments has been provided for purposes of illustration and description. It is not intended to be exhaustive or to limit the disclosure. Individual elements, intended or stated uses, or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A system configured for allowing an operator(s) to remotely control operation of a locomotive with gesture(s) made by an operator(s), the system comprising:
   at least one processor configured to be operable for visually recognizing gesture(s) made by an operator(s) in one or more images captured by at least one camera; and
   a locomotive control unit configured to be operable for controlling the operation of the locomotive according to the visually recognized gesture(s) made by the operator(s).

2. The system of claim 1, wherein the at least one processor comprises an edge processing device.

3. The system of claim 1, wherein the at least one processor comprises a neural network.

4. The system of claim 1, wherein the at least one processor comprises an edge processing device running a single shot detector (SSD) neural network.

5. The system of claim 1, wherein:
the at least one processor is in communication via a serial connection with the locomotive control unit; and
the at least one processor is configured to be operable for relaying one or more decisions, commands, and/or instructions to the locomotive control unit over the serial connection based on the visually recognized gesture(s).

6. The system of claim 5, wherein the locomotive control unit is configured to be operable for controlling operation of the locomotive according to the one or more decisions, commands, and/or instructions relayed to the locomotive control unit from the at least one processor over the serial connection.

7. The system of claim 1, wherein the locomotive control unit is configured to be operable for controlling operation of the locomotive in accordance with an algorithm(s) associated with or allocated to the visually recognized gesture(s).

8. The system of claim 1, wherein the at least one camera, the at least one processor, and the locomotive control unit are onboard the locomotive.

9. The system of claim 1, wherein:
the system includes the at least one camera comprising at least one video camera onboard the locomotive for capturing video of the gesture(s) made by the operator(s); and
the at least one processor is configured to visually recognize the gesture(s) made by the operator(s) in the video captured by the at least one video camera.

10. The system of claim 1, wherein the at least one processor is configured to be operable for visually recognizing gesture(s) made by the operator(s) including one or more of an operator's hand signal(s), body language, and/or pose(s).

11. A method of remotely controlling operation of a locomotive with gesture(s) made by an operator(s), the method comprising:
capturing, via at least one camera, one or more images of gesture(s) made by an operator(s);
visually recognizing, via at least one processor, the gesture(s) made by the operator(s) in the one or more images captured by the at least one camera; and
controlling operation of the locomotive, via a locomotive control unit, according to the visually recognized gesture(s) made by the operator(s).

12. The method of claim 11, wherein:
the at least one processor comprises an edge processing device; and
the method includes visually recognizing, via the edge processing device, the gesture(s) made by the operator(s) in the one or more images captured by the at least one camera.

13. The method of claim 11, wherein:
the at least one processor comprises a neural network; and
the method includes visually recognizing, via the neural network, the gesture(s) made by the operator(s) in the one or more images captured by the at least one camera.

14. The method of claim 11, wherein:
the at least one processor comprises an edge processing device running a single shot detector (SSD) neural network; and
the method includes visually recognizing, via the edge processing device running the single shot detector (SSD) neural network, the gesture(s) made by the operator(s) in the one or more images captured by the at least one camera.

15. The method of claim 11, wherein:
the at least one processor is in communication via a serial connection with the locomotive control unit; and
the method includes relaying one or more decisions, commands, and/or instructions based on the visually recognized gesture(s) from the at least one processor over the serial connection to the locomotive control unit.

16. The method of claim 15, wherein the method includes controlling operation of the locomotive, via the locomotive control unit, according to the one or more decisions, commands, and/or instructions relayed to the locomotive control unit from the at least one processor over the serial connection.

17. The method of claim 11, wherein the method includes controlling operation of the locomotive, via the locomotive control unit, in accordance with an algorithm(s) associated with or allocated to the visually recognized gesture(s).

18. The method of claim 11, wherein the at least one camera, the at least one processor, and the locomotive control unit are onboard the locomotive.

19. The method of claim 11, wherein:
the at least one camera comprising at least one video camera onboard the locomotive for capturing video of the gesture(s) made by the operator(s); and
the method includes:
capturing, via the at least one video camera, video of the gesture(s) made by the operator(s); and
visually recognizing, via the at least one processor, the gesture(s) made by the operator(s) in the video captured by the at least one video camera.

20. The method of claim 11, wherein the visually recognized gesture(s) made by the operator(s) comprise one or more of an operator's hand signal(s), body language, and/or pose(s).

* * * * *